United States Patent [19]

Heidman, Jr.

[11] 4,354,174
[45] Oct. 12, 1982

[54] ANTI-THEFT DOOR ACTUATED HAZARD LIGHT AND HORN CIRCUITS FOR AUTOMOBILES

[76] Inventor: William A. Heidman, Jr., 4604 Robbins, San Diego, Calif. 92122

[21] Appl. No.: 139,789

[22] Filed: Apr. 14, 1980

[51] Int. Cl.³ .................. B60Q 1/46; B60R 25/10
[52] U.S. Cl. .................. 340/63; 307/10 AT; 315/83; 315/84; 340/75; 340/81 F
[58] Field of Search .......... 340/63, 64, 65, 81 F, 340/83, 88, 75, 76; 307/10 AT; 315/83, 84

[56] References Cited

U.S. PATENT DOCUMENTS

| | | | |
|---|---|---|---|
| 2,321,803 | 6/1943 | Falge et al. | |
| 2,519,758 | 8/1950 | Heidman, Jr. | 200/44 |
| 2,654,079 | 9/1953 | Ringwald | 340/81 |
| 2,667,603 | 1/1954 | Hollins | 315/80 |
| 2,761,121 | 8/1956 | Caporale | 340/52 |
| 2,766,343 | 10/1956 | Heidman, Jr. | 200/61.29 |
| 2,802,142 | 8/1957 | Johnson | 315/80 |
| 2,812,396 | 11/1957 | Hollins | 200/61.35 |
| 2,844,810 | 7/1958 | Steele, Jr. | 340/87 |
| 3,074,049 | 1/1963 | Saliba et al. | 340/65 |
| 3,182,289 | 5/1965 | Rossi | 340/83 |
| 3,185,961 | 5/1965 | Du Rocher | 340/81 |
| 3,209,326 | 9/1965 | Heiser | 340/63 |
| 3,263,211 | 7/1966 | Heidman, Jr. | 340/81 |
| 3,372,373 | 3/1968 | Heidman, Jr. | 340/74 |
| 3,372,374 | 3/1968 | Heidman, Jr. | 340/81 |
| 3,436,728 | 4/1969 | Silverwood et al. | 340/76 X |
| 3,493,926 | 2/1970 | Morena | 340/76 |
| 3,858,175 | 12/1974 | Kopera, Jr. | 340/63 |
| 3,913,066 | 10/1975 | Kehry et al. | 340/63 |
| 3,938,534 | 9/1976 | Goodman | 340/63 |
| 3,997,870 | 12/1976 | Horvath | 340/63 |
| 4,087,784 | 5/1978 | West | 340/81 F |

Primary Examiner—John W. Caldwell, Sr.
Assistant Examiner—Joseph E. Nowicki
Attorney, Agent, or Firm—Brown & Martin

[57] ABSTRACT

Anti-theft circuits are provided which can be obtained by incorporating a few components into the electrical system of an existing automobile. In one embodiment interior mounted anti-theft and bypass switches, and an exterior mounted arming switch are interconnected between the turn signal circuitry, the horn circuitry and the door actuated dome and courtesy light circuitry. When all three of these switches are in their off positions, operation of the turn signal lamps, the brake lamps, the horn, and the dome and courtesy lights is conventional. Both the anti-theft and bypass switches can be moved to their on positions to place the circuit into a hazard mode in which the front and rear turn signal lamps flash on and off together, and the rear brake lamps flash on and off together alternatingly with the flashing of the rear turn signal lamps. When only the anti-theft and arming switches are in their on positions, unauthorized opening of any of the passenger doors, trunk lid, hood or fuel door by a would-be car thief will cause intermittent honking of the horn and flashing of the turn signal and brake lamps.

13 Claims, 4 Drawing Figures

ANTI-THEFT DOOR ACTUATED HAZARD LIGHT AND HORN CIRCUITS FOR AUTOMOBILES

BACKGROUND OF THE INVENTION

The present invention relates to driver actuated devices for preventing theft of unoccupied automobiles. More particularly, the present invention relates to circuits which can be readily provided in the electrical system of a conventional automobile so that when armed the unathorized opening of any one of the passenger doors, trunk lid, hood, or fuel door will result in intermittent blasting of the automobile horn, together with flashing of the directional and brake lamps.

As a result of the continuing increase in the crime rate much attention has been focused upon various driver-armed systems for preventing theft of unoccupied automobiles. Many of these systems include complex components which make their installation both costly and time consuming. Others are easily disarmed by the experienced car thief. Often such systems are triggered by component failures or by external forces acting on the car which are not the result of an attempted car theft. This frequently results in annoying siren noise to neighbors, and all too frequently, run down car batterys. For example, many presently available systems include tilt switches which may be inadvertently closed by a ball bouncing off the car, or by heavy wind or rain.

Recently at least one CADILLAC automobile has been available with a theft deterrent option. When armed, if a person reaches in from outside the car and unlocks the door, the car horn will blast intermittently and the headlights will flash on and off. A starter-disablement circuit thereafter prevents the car engine from being started by putting the key in the ignition. The theft-deterrent system can be shut off by placing the key in the door lock. Details of the exact circuitry of this system are not presently known to me.

In my U.S. Pat. Nos. 3,263,211; 3,372,373; and 3,372,374, I have disclosed various flashing hazard light circuits which are adapted to be incorporated into the electrical systems of existing automobiles with readily available components. Also of general interest in the automobile wiring field are U.S. Pat. Nos. 2,321,803; 2,519,758; 2,654,079; 2,667,603; 2,761,121; 2,766,343; 2,802,142; 2,812,396; 2,844,810; 3,074,049; 3,182,289; and 3,185,961.

SUMMARY OF THE INVENTION

It is therefore an object of the present invention to provide an anti-theft system of the aforementioned type which will provide for intermittent blasting of the automobile horn and flashing of the turn signal and brake lamps of the automobile upon unathorized opening of any of the structural panels of the automobile.

Another object of the present invention is to provide an anti-theft system of the aforementioned type which retains the capability for the normal turn signal operation, horn operation, brake light operation, and courtesy and dome light operation.

Another object of the present invention is to provide an anti-theft door actuated hazard light and horn circuit which can be obtained by incorporating a relatively small number of readily available components into the existing electrical system of the automobile and which is capable of simultaneously, selectively, and independently operating certain standard components in the circuit.

The present invention provides theft deterrent circuits which can easily and inexpensively be obtained by incorporating a few readily available components into the electrical system of an existing automobile. In one embodiment interior mounted anti-theft and bypass switches, and an exterior mounted arming switch are interconnected between the turn signal circuitry, the horn circuitry and the door actuated dome and courtesy light circuitry. When all three of these switches are in their off positions, operation of the turn signal lamps, the brake lamps, the horn, and the dome and courtesy lights is conventional. Both the anti-theft and bypass switches can be moved to their on positions to place the circuit into a hazard mode in which the front turn signal lamps flash on and off together, the rear turn signal lamps flash on and off together, and the rear brake lamps flash on and off together alternatingly with the flashing of the rear turn signal lamps. With only the anti-theft and arming switches in their on or closed positions, unauthorized opening of any of the passenger doors, trunk lid, hood or fuel door will cause intermittent honking of the horn and flashing of the turn signal and brake lamps to deter a would-be car thief.

DESCRIPTION OF THE PREFERRED EMBODIMENT

Figure 1:
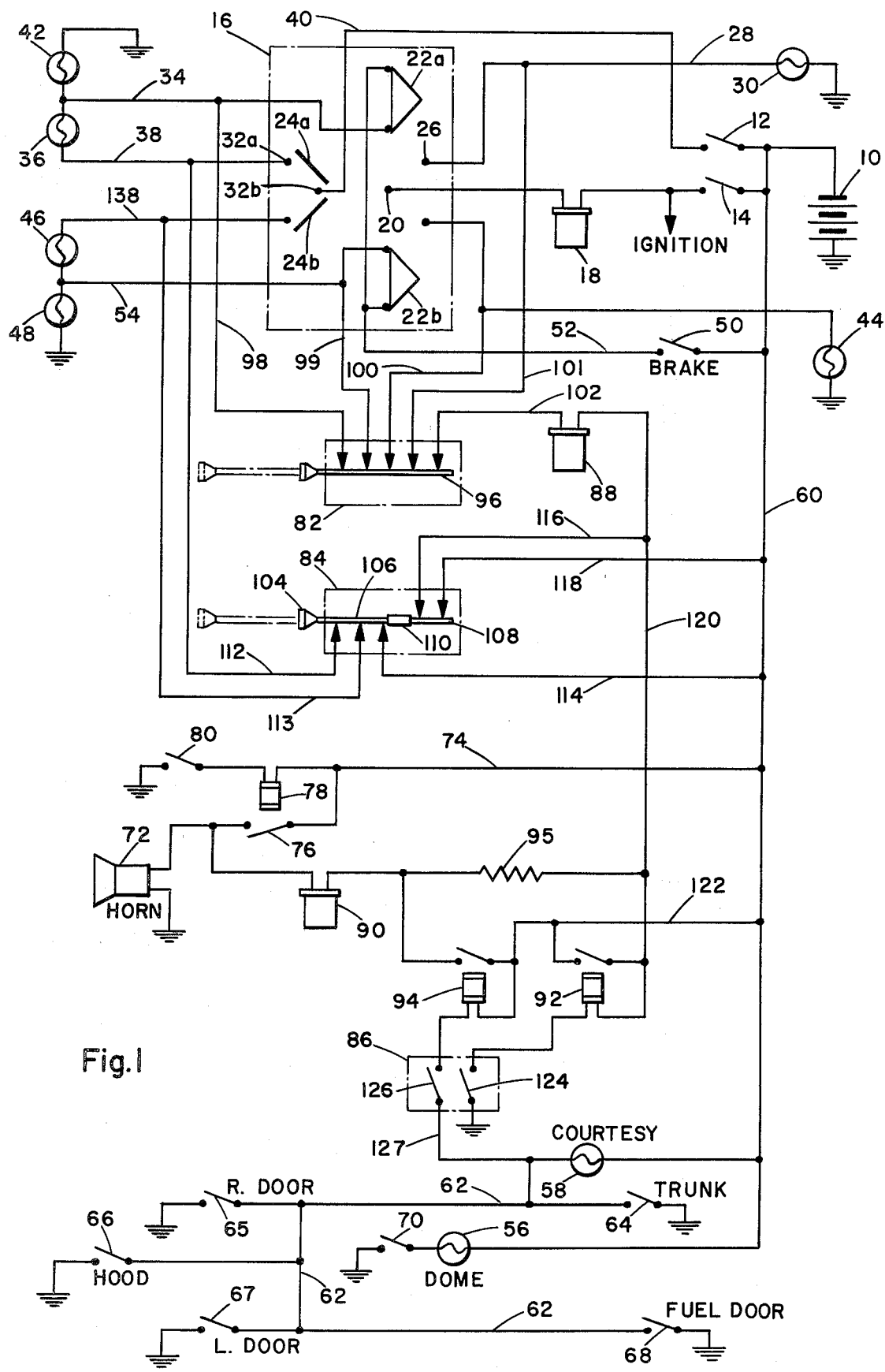
FIG. 1 is a schematic diagram of a circuit representing one embodiment of the present invention.

Referring to FIG. 1, there is illustrated therein in schematic form one embodiment of an anti-theft door actuated hazard light and horn circuit in accordance with the present invention. By using a relatively small number of readily available components, the electrical wiring system of a vast portion of present day automobiles may be modified to obtain the circuit illustrated in FIG. 1. That circuit includes a conventional car battery 10 whose negative terminal is grounded and whose positive terminal is connected through a pair of ganged ignition switches 12 and 14 to a conventional turn signal switch assembly 16 (outlined in phantom lines) and a turn signal flasher 18. As used herein, the term "flasher" includes any circuit means which periodically opens and closes a conductive path in uniform cyclical fashion. In automobile electrical systems, typically thermally actuated flashers are utilized.

As is conventional, in the circuit of FIG. 1, when the ignition key is inserted in the ignition lock it can be turned to simultaneously close both of the switches 12 and 14 to start the engine. Thereafter the ignition key may be turned in the opposite direction to open both of the switches 12 and 14 to disconnect the turn signal switch assembly 16 and to turn off the engine. When the car is not running, this prevents the driver from inadvertently leaving the turn signal lights flashing. It also prevents children from operating the turn signals when the car is parked.

The flasher 18 (FIG. 1) is adapted to energize a center terminal 20 of the turn signal switch assembly 16. This assembly has selectively movable contacts 22a, 22b, 24a and 24b which are ganged together for simultaneous movement from a neutral position shown in FIG. 1 by operation of the turn signal lever on the steering column (not shown). When the turn signal lever is moved to its left turn position, contact 22a connects the center terminal 20 and a left front terminal 26. This provides a path for intermittent current from the flasher 18 to flow through a conductor 28 to intermittently energize a left front turn signal lamp 30 connected on one side to ground. Movement of the turn signal level to its left turn position also causes contact 24a to connect a pair of left rear terminals 32a and 32b. Thus, positive potential from the flasher 18 is connected through the center terminal 20, the contact 22a and a conductor 34 to one side of a left rear turn signal lamp 36. The other side of the turn signal lamp 36 is connected through a conductor 38, through the contact 24a through a conductor 40 and through the closed switch 12 to the positive terminal of the battery 10. The one side of the turn signal lamp 36 is connected in series with one side of a left rear brake lamp 42 whose other side is grounded.

When positive potential is supplied from the flasher 18 to the one side of the turn signal lamp 36, it is opposed by an equal positive potential on the other side of the lamp 36 through the conductor 38. Thus, at this time the turn signal lamp 36 is not illuminated. However, at this time the brake lamp 42 is illuminated since current from the conductor 34 can flow through its filament to ground. When the flasher 18 interrupts the connection between the center terminal 20 and the positive terminal of the battery 10, current flows through the conductor 38 and through the filament of the turn signal lamp 36 and the filament of the brake lamp 42 to ground. In this condition the directional lamp 36 is illuminated and the brake lamp 42 is extinguished. Thus, when the turn signal lever is moved to its left turn position, simultaneous flashing of the left front and rear turn signal lamps 30 and 36 occurs. In addition, the left rear turn signal and brake lamps 36 and 42 flash alternately to provide a more eye catching turn indication to following drivers.

When the turn signal lever is moved to its right turn position, the right front and rear turn signal lamps 44 and 46 flash as a result of electrical connections being made which are similar with respect to those described in connection with the left front and rear turn signal lamps 30 and 36. A similarly connected left rear brake lamp 48 flashes alternately with the flashing of the left rear turn signal lamp 46. It wil be noted that the left rear turn signal lamp 46 is also connected on one side through the filament of the left rear brake lamp 48 which in turn is connected on its other side to ground. Since most automobile exterior lamp sockets are grounded to the car body, in the present invention new sockets for the lamps 36 and 46 are provided so that they can be connected to the brake lamp filaments.

A brake light switch 50 may be closed by depressing the brake pedal of the automobile a sufficient degree so that it connects the positive terminal of the battery 10 to a conductor 52 connected in parallel to the contacts 22a and 22. When the turn signal lever is in its neutral position and the contacts 22a and 22b are in their positions illustrated, the brake lamps 42 and 48 are both energized through conductors 34 and 54. As is conventional in the turn signal switch assembly 16 the conductor 52 is disconnected from the contacts 22a or 22b when the turn signal lever is moved to its left and right turn positions, respectively. This prevents the closing of the brake switch 50 from interfering with the aforementioned normal turn signal operation.

Most automobiles, particularly of the passenger variety, are also provided with interior lights such as a dome light 56 and a courtesy light 58. These lights are normally energized through a conductor 60 connected ahead of the ignition switches 12 and 14 to the positive terminal of the battery 10. A common ground conductor network 62 is connected to each of the lights 56 and 58 and operatively connects these lights to a plurality of switches 64–68. These switches are actuated by the trunk lid, left and right passenger doors, hood, and fuel door of the automobile as indicated in FIG. 1. Switches 64–68 are each open and closed when the trunk lid, left and right doors, hood and fuel door are closed and opened, respectively. As used herein the term "movable structural panel" when used in reference to an automobile, shall mean any of the passenger doors, trunk lid, hood, fuel door, sunroof, etc. Thus, when a person opens either passenger door to enter or exit the automobile, the dome and courtesy lights 56 and 58 will illuminate the interior of the vehicle to facilitate entrance or exit.

In addition to door actuated switches 64–68, it is common to provide individual interior switches such as 70 for grounding the dome light 56 to permit illumination of such light when the doors of the automobile are closed. This is desirable, for example, when a driver seeks to read a map in the autombile at night.

Most, if not all automobiles, include as standard equipment an electrically operated horn such as 72 in FIG. 1, primarily for defensive driving purposes. One electrical terminal of the horn is grounded, and the other terminal can be selectively connected to a conductor 74 connected to the positive terminal of the battery 10 through the conductor 60 by a relay operated switch 76. The relay operated switch includes a coil 78 which can be selectively energized to close the switch 76 and thereby blast the horn 72 by manually closing a normally open horn button switch 80 connected on one side to ground. The horn button switch is typically mounted in the center of the steering wheel of the automobile. As used herein the term "relay" refers to a combination such as the relay operated switch 76 and the coil 78.

In addition to the circuitry already described, the circuit of FIG. 1 includes an anti-theft switch 82, a bypass switch 84, and an arming switch 86 which are interconnected with the lamps, lights and horn so that they can operate simultaneously, selectively and yet independently. This permits normal turn signal operation, normal hazard light operation, normal horn operation, normal dome and courtesy light operation, normal brake light operation, etc., in addition to anti-theft operation of the turn signal lamps, brake lamps, and horn. In order to achieve all of the aforementioned capabilities, the circuit incudes second and third flashers 88 and 90, second and third relays 92 and 94 and a resistor 95. The operating voltages and currents of these last mentioned components must be chosen so that they will perform the functions hereafter described.

The anti-theft switch 82 (FIG. 1) may be of the slide type. It includes a slide member 96 which may be manually moved from an "off" position shown in phantom lines to an "on" position shown in solid lines. The slide member is made of a conductive material. When the slide member 96 is slid to its on position, five separate conductors 98–102 are mutually connected in parallel through the conductive body of the slide member.

The bypass switch 184 may also be of the slide type. It includes a slide member 104 which is manually movable from an "off" position, shown in phantom lines in FIG. 1, to an "on" position shown in solid lines. The slide member 104 includes two segments 106 and 108 made of an electrically conductive material which are separated by a segment 110 made of a non-conductive material. When the slide member 104 of the bypass switch 84 is moved to its on position conductors 112–114 are connected in parallel through the conductive segment 106. In addition conductors 116 and 118 are connected in series through the conductive segment 108. When the slide member 104 is moved to its off position, the conductors 112–114 are disconnected from one another and the connection between the conductors 116 and 118 is broken.

One side of the flasher 88 is connected to one end of the conductor 102 whose other end is adapted for connection to the conductors 98–101 by movement of the slide member 97 to its "on" position. The other side of the flasher 88 is connected through a conductor 120 to the holding relay 92 as shown. The relay 94 is in turn connected through a conductor 122 to the positive terminal of the battery 10 through the conductor 60. The coils of the relays 92 and 94 are also each connected as shown to the one sides of a pair of ganged switches 124 and 126 forming a part of the arming switch 86. The other side of the switch 124 is grounded and the other side of the switch 126 is connected through a conductor 127 to the ground conductor network 62. The relay 94 is connected to the relay 92 as shown and the relay 94 is also connected through the flasher 90 to the horn 72. The ends of the conductors 98–102, 112–114, 116 and 118 which are remote from the switches 82 and 84 are interconnected with various other conductors in the circuit as shown including the conductors leading to the turn signal and brake lamps.

Figure 2:
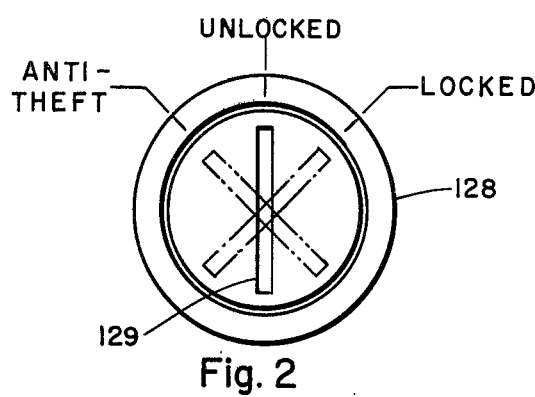
FIGS. 2 and 3 illustrate preferred forms of the ignition and fuel door lock and switch combinations which may be utilized in conjunction with the circuit of FIG. 1.

Preferably the arming switch 86 is mounted in an exterior location on the automobile. For example, it may be constructed in combination with the fuel door lock 128 (FIG. 2). Preferably the combination of the fuel door lock 128 and the arming switch 86 is constructed so that when a key 129 is inserted into this lock, three modes are available. When the key is turned as far as it will go in the clockwise direction, the fuel door is locked and the ganged switches 124 and 126 are both open. When the key 129 is turned to the twelve o'clock position the fuel door is unlocked to permit access to the gas cap, the switches 124 and 126 remaining open. When the key 129 is turned to its farthest counterclockwise position, the fuel door is once again locked and the switches 124 and 126 are closed, thus arming the anti-theft circuitry.

Preferably the anti-theft and bypass switches 82 and 84 are immediately adjacent to the interior ignition lock 130 (FIG. 3) which is mounted on the steering column of most domestic automobiles. The ignition switches 12 and 14 (FIG. 1) are normally open and may be closed by inserting an ignition key 131 into the lock and rotating the key clockwise in FIG. 3, as is conventional. Preferably the lock 130 has an annular collar 132 which rotates with the ignition key. This collar has a pair of shields 134 and 136 which project from opposite sides thereof and move in the directions indicated by the arrows in FIG. 3 when the ignition key is rotated. Preferably the switches 82 and 84 have a linear configuration and they are mounted on opposite sides of the collar 132 of the ignition lock with their longitudinal axes substantially parallel to the axis of rotation of the ignition key. The slide members 96 and 104 of the switches 82 and 84 may have knobs which are moved longitudinally inwardly and outwardly a short distance to place the switches 82 and 84 into their "on" and "off" modes, respectively.

Figure 3:
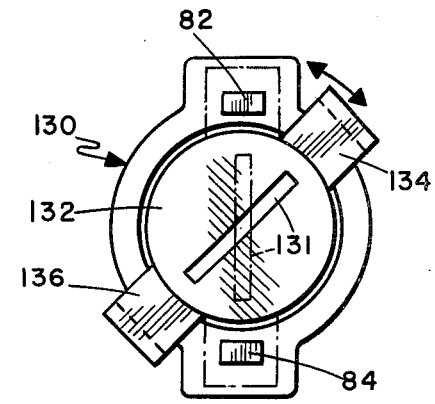

The ignition lock 130 and the shields 134 and 136 are constructed so that when the ignition key 131 is in its "off" position shown in FIG. 3, the shields 134 and 136 will cover the ends of the switches 82 and 84 so that their selective slide members cannot be operated. However, when the ignition key 131 is rotated clockwise to its "on" position shown in solid lines in FIG. 3, the shields 134 and 136 move to their positions shown in solid lines in FIG. 3. This uncovers the slide members of the switches 82 and 84 so that they can be actuated by the driver. As will later become apparent, the aforementioned arrangement in the ignition lock 130 prevents a car thief who has gained access into the interior of the automobile from disenabling the anti-theft alarm activity hereafter described.

The overall operation of the circuitry just described will not be set forth. Under normal operation conditions, when the car is being driven the anti-theft, bypass, and arming switches 82, 84, and 86 respectively, are in their "off" or open position. In this state, the brake lamps 42 and 48 are operated in normal fashion by depressing the brake pedal in closing the switch 50. The horn may also be operated when desired by pressing the horn button switch 80 in the middle of the steering wheel. Movement of the turn signal switch lever from its neutral position to either its left turn or right turn position causes intermittent flashing of the left turn signal lamps 30 and 36 or the right turn signal lamps 44 and 46, respectively. Each brake lamp flashes alternatingly with the flashing of its adjacent turn signal lamp.

If, during the operation of the automobile the drive should desire to have flashing hazard lights, he or she can manually move the slide members 96 and 106 of the switches 82 and 84, respectively, to their "on" positions. Current will then flow from the positive terminal of the battery 10, through the conductors 60 and 118, through the conductive segment 108, and through the conductor 116 to the flasher 88. Intermittent current from the flasher 88 will be carried by the conductor 102 through the conductive slide member 96 to the conductor 101 and 100 and thence to the front turn signal lamps 30 and 44 which will flash on and off together. Intermittent positive potential from the flasher 88 will also be supplied through the conductors 98 and 34 to one side of the lamp 36 and through the conductors 99 and 54 to one side of the lamp 46. This positive potential supplied by the flasher 88 to the lamps 36 and 46 will be equally opposed by positive potential supplied to the other sides of these lamps through the conductors 112 and 38 and the conductors 113 and 138, respectively. Thus when positive potential is not supplied to the lamps 36 and 46 by the flasher 88, current will flow through the conductors 38 and 138, through the lamps 36 and 46 respectively, to ground. When current is supplied from the flasher 88 to the conductors 34 and 54, the brake lamps 42 and 48 will flash. Thus in the hazard mode, both the rear directional lamps 36 and 46 will flash together and both the brake lamps 42 and 48 will flash together, the directional lamps and the brake lamps flashing in alternating fashion. In the hazard mode, the resistor 95 will prevent intermittent honking of the horn.

If the driver should desire to place the automobile in an anti-theft mode, prior to turning off the ignition, he or she will first place the anti-theft switch 82 in its on mode, leaving the bypass switch 84 in its off mode. Upon exiting the automobile and locking all doors, the driver will then place the fuel door lock 128 in its on mode, thereby closing the ganged switches 124 and 126 and arming the anti-theft circuit. Thereafter, should a car thief open any of the passenger doors, the trunk lid, the hood, or the fuel door, the horn 72 will blast intermittently and the turn signal and brake lamps will flash intermittently as just described. Generally the attention that such honking and light flashing will attract will be sufficient to send most car thieves fleeing. If the determined car thief gets inside the car while the horn is honking and thereafter closes the door, the horn honking will stop, however, the flashing of the lamps will continue. This is because the relay 92 acts as a holding relay once it has been armed through via the small current supplied through resistor 95 by energization of the arming relay 94. The flashing of the lamps ceases only when the arming switch is turned off by key 129.

When the driver returns to the automobile, he or she first disarms the circuit via the fuel door key before entering the vehicle. Then, upon turning on the ignition with the ignition key, the anti-theft switch is moved to its off position to permit normal operation of the turn signal lamps, brake and horn during driving.

Figure 4:
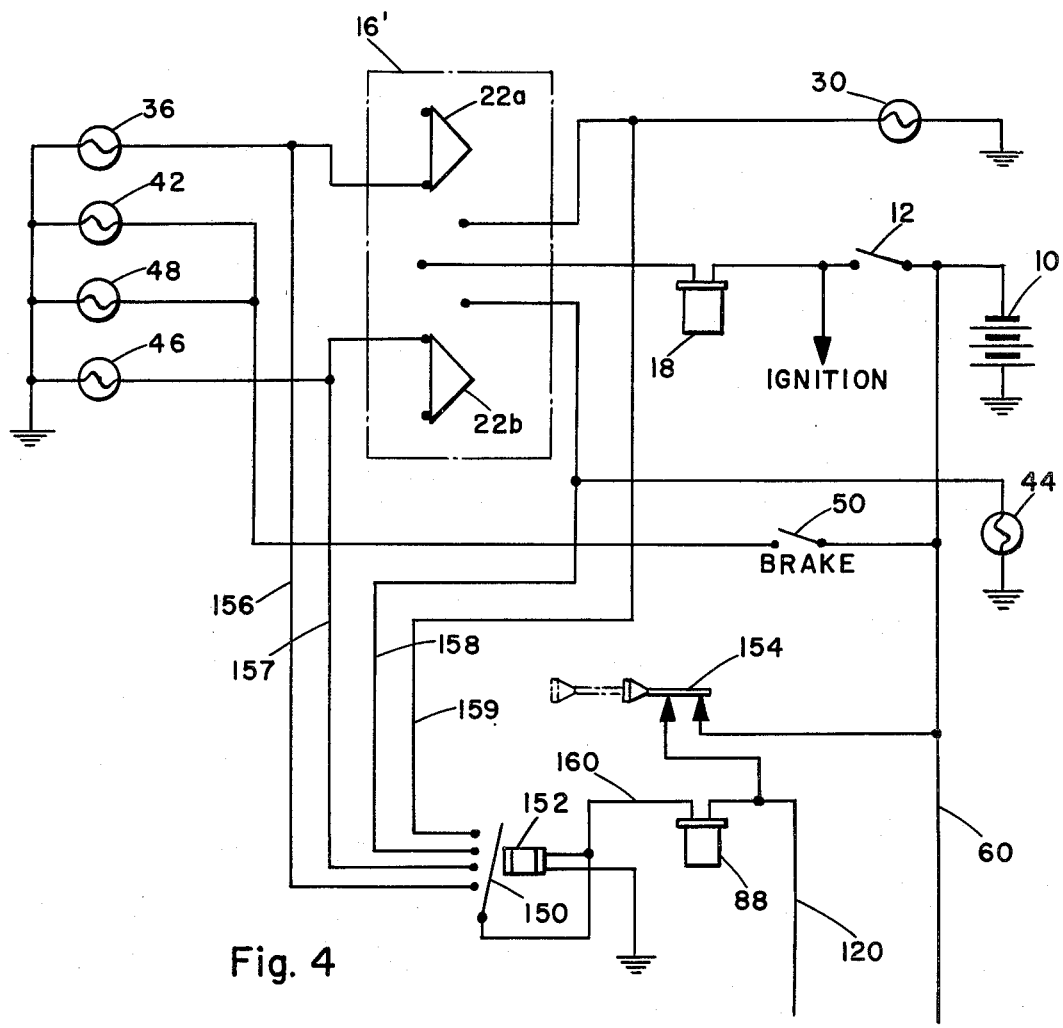
FIG. 4 is a schematic diagram of a portion of a circuit representing a second embodiment of the present invention.

Referring to FIG. 4 there is illustrated therein a schematic diagram of a portion of a circuit representing a second embodiment of the present invention. Specifically, the circuit illustrated in FIG. 4 replaces that portion of the circuit of FIG. 1 which is above the conductor 74. The portions of the conductors 60 and 120 shown in FIG. 4 connect to the portions of the same numbered conductors in FIG. 1 which are below the conductor 74. In FIG. 4, parts similar to those in the circuit of FIG. 1 are indicated with like reference numerals. The second embodiment of the circuit of the present invention thus consists of the circuit in FIG. 4 connected to the portion of the circuit of FIG. 1 below the conductor 74, as previously indicated.

In FIG. 4, it can be seen that in the second embodiment the rear turn signal lamps 36 and 46 are connected independently to the contacts 22a and 22b of a slightly modified turn signal switch assembly 16'. The brake lamps 42 and 48 are connected directly to the brake switch 50 and are not disconnected by movement of the switch assembly contacts 22a and 22b.

The anti-theft switch is in the form of a relay operated switch 150 actuated by a coil 152. One side of the coil 152 is grounded and the other side of the coil is connected to one side of the flasher 88 as shown. The other side of the flasher 88 is connected to the conductor 120 and to one side of a two contact, slide-type bypass switch 154 preferably mounted for selective concealment in connection with the ignition lock in the same fashion as the bypass switch 84 (see FIG. 3). When the coil 152 is energized, the switch 150 is closed, connecting the one ends of four conductors 156-159 in parallel to a conductor 160 leading to the flasher 88. The other ends of the conductors 156-159 are connected to separate conductors leading to the front rear directional lamps as shown.

In the second embodiment the operation of the turn signal lamps and the brake lamps is conventional with the anti-theft, bypass, and arming switches 150, 154, and 86, respectively, all open. When the bypass switch 154 is closed the coil 152 is intermittently energized, thus causing intermittent closing of the anti-theft switch 150 and simultaneous flashing of all four directional lamps. With the bypass switch 154 open and the arming switch 86 closed, unauthorized opening of any one of the structural panels of the automobile will cause intermittent honking of the horn 72 (FIG. 1) and flashing of the turn signal lamps to deter the would-be thief. The second embodiment thus provides a simpler, more automatic anti-theft circuit.

Having described preferred embodiments of my invention, it should be apparent that modifications and adaptations thereof will occur to those skilled in the art. However, my invention should be limited only in accordance with the scope of the following claims.

I claim:

1. In combination with the wiring system of an automobile having a battery with a positive terminal and a negative terminal, the negative terminal of the battery being connected to a ground, at least one ignition switch having a first side connected to the positive terminal of the battery, a pair of left and right forward turn signal lamps, a pair of left and right rear turn signal lamps, a pair of left and right rear brake lamps, a turn signal switch assembly, a flasher, a brake light switch, a plurality of conductors interconnecting the lamps, ignition switch, brake light switch, flasher and turn signal switch assembly to permit selective flashing of the left or right turn signal lamps and selective simultaneous illumination of both of the brake lamps, the wiring system further including a horn, and at least one interior light having a first terminal connected to the positive terminal of the battery and a second terminal connectable to the ground by the closing of any one of a plurality of automobile body mounted switches through the opening of a corresponding one of a plurality of structural access panels of the automobile, the improvement comprising:

an anti-theft switch;
a bypass switch;
an arming switch; and
means for interconnecting the anti-theft switch, the bypass switch, and the arming switch with the battery, the flasher, the turn signal lamps, the brake lamps, the turn signal switch assembly, the horn and the interior light so that when the ignition switch is open, closing the anti-theft switch and the bypass switch without closing the arming switch will cause intermittent flashing of the turn signal lamps and the brake lamps to provide a hazard mode, and closing the anti-theft switch and the arming switch without closing the bypass switch and thereafter opening of any one of the structural access panels will result in intermittent blasting of the horn and flashing of the turn signal lamps and the brake lamps to provide an anti-theft mode.

2. The invention of claim 1 wherein the turn signal lamps and the brake lamps each have a filament, the filaments of the left rear turn signal lamp and the left brake lamp are connected in series to the ground, the filaments of the right rear turn signal lamp and the right brake lamp are connected in series to the ground, and the interconnecting means is connected to the plurality of conductors interconnecting the lamps, ignition switch, brake light switch, flasher and turn signal switch assembly so that in the hazard mode and in the anti-theft mode the rear turn signal lamps and the brake lamps will flash alternatingly.

3. The invention of claim 1 wherein the interconnecting means includes a holding relay interconnected between the anti-theft switch, the bypass switch, the arming switch, and the horn so that in the anti-theft mode closing of the one structural access panel will not terminate the flashing of the turn signal lamps and the brake lamps.

4. The invention of claim 1 wherein the interconnecting means includes a second flasher interconnected between the anti-theft switch, the bypass switch, the arming switch, and the positive terminal of the battery for providing intermittent signals to the turn signal lamps and the brake lamps.

5. The invention of claim 4 wherein the interconnecting means includes a third flasher connected to the horn and selectively connectable to the positive terminal of the battery to provide intermittent current to the horn.

6. The invention of claim 1 wherein the anti-theft switch and the bypass switch are mounted in the interior of the automobile, and the arming switch is mounted on the exterior of the automobile.

7. The invention of claim 6 wherein the anti-theft switch and the bypass switches are linear slide switches, each including a manually movable slide member, the automobile includes an ignition lock having a collar adapted to be rotated by an ignition key, the collar having a pair of shields which extend therefrom, and further wherein the anti-theft switch and the bypass switch are mounted adjacent the ignition lock so that the collar can be rotated with the ignition key to conceal the slide members behind the shields to prevent manual movement thereof.

8. The invention of claim 6 wherein the automobile further includes a fuel door lock actuated by a fuel door key and the arming switch is adapted to be actuated by movement of the fuel door key in the fuel door lock.

9. The invention of claim 1 wherein the arming switch includes a pair of ganged switches.

10. The invention of claim 1 wherein the arming switch includes first and second ganged switches each having first and second sides, the first side of the first ganged switch being connected to the ground and the first side of the second ganged switch being connected to the plurality of automobile body mounted switches, and further wherein the interconnecting means includes:

a second flasher having first and second terminals, the first terminal of the second flasher being connected to the anti-theft switch;

a third flasher having first and second terminals, the first terminal of the third flasher being connected to the horn;

a resistor having a first end connected to the second terminal of the second flasher and a second end connected to the second terminal of the third flasher;

a holding relay having a switch and a coil for closing the holdng relay switch when energized, the switch of the holding relay having first and second sides, the coil of the holding relay having first and second terminals, the first side of the holding relay switch being connected to the positive terminal of the battery, the second side of the holding relay switch being connected to the first end of the resistor and the second terminal of the holding relay coil, and the first terminal of the holding relay coil being connected to the second side of the first ganged switch of the arming switch; and an arming relay having a switch and a coil for closing the arming relay switch when energized, the switch of the arming relay having first and second sides, and the coil of the arming relay having first and second terminals, the first side of the arming relay switch being connected to the second terminal of the third flasher and to the second end of the resistor, the second side of the arming relay switch being connected to the first side of the holding relay switch and to the second terminal of the arming relay coil, and the first terminal of the arming relay coil being connected to the second side of the second ganged switch of the arming switch.

11. In combination with the wiring system of an automobile having a battery with a positive terminal and a negative terminal, the negative terminal of the battery being connected to a ground, at least one ignition switch having a first side connected to the positive terminal of the battery, a pair of left and right forward turn signal lamps, a pair of left and right rear turn signal lamps, a turn signal switch assembly, a first flasher, a plurality of first conductors interconnecting the lamps, ignition switch, flasher and turn signal switch assembly to permit selective flashing of the left or right turn signal lamps, the wiring system further including a horn, and at least one interior light having a first terminal connected to the positive terminal of the battery and a second terminal connectable to the ground by the closing of any one of a plurality of automobile body mounted switches through the opening of a corresponding one of a plurality of structural access panels of the automobile, the improvement comprising:

a relay actuated anti-theft switch having a first side and a second side;

a coil for opening and closing the anti-theft switch, the coil having a first terminal and a second terminal, the first terminal of the coil being connected to the ground;

a plurality of second conductors each having a first end and a second end, the first ends of the second conductors being connected to the first side of the anti-theft switch and the second ends of the second conductors being connected to separate ones of the first conductors which are connected to the turn signal lamps;

a second flasher having first and second terminals, the first terminal of the second flasher being connected to the second terminal of the coil and to the second side of the anti-theft switch;

a bypass switch having a first side and a second side, the first side of the bypass switch being connected to the second terminal of the second flasher and the second side of the bypass switch being connected to the positive terminal of the battery;

a manually actuable arming switch; and means for interconnecting the arming switch between the positive terminal of the battery, the horn, the interior light and the second terminal of the second flasher so that when the bypass switch is closed and the arming switch is open the turn signal lamps will flash, and when the bypass switch is open and the arming switch is closed, opening of any of the structural access panels will cause intermittent blasting of the horn and flashing of the turn signal lamps.

12. In combination with the wiring system of an automobile having a battery with a positive terminal and a negative terminal, the negative terminal of the battery being connected to a ground, at least one ignition switch having a first side connected to the positive terminal of the battery, a pair of left and right forward turn signal lamps, a pair of left and right rear turn signal lamps, a pair of left and right rear brake lamps, a turn signal switch assembly, a flasher, a plurality of conductors interconnecting the lamps, ignition switch, flasher and turn signal switch assembly to permit selective flashing of the left or right turn signal lamps, the wiring system further including a horn, and at least one interior light having a first terminal connected to the positive terminal of the battery and a second terminal connectable to the ground by the closing of any one of a plurality of automobile body mounted switches through the opening of a corresponding one of a plurality of structural access panels of the automobile, the improvement comprising:
   an anti-theft switch;
   a bypass switch;
   an arming switch; and
   means for interconnecting the anti-theft switch, the bypass switch, and the arming switch with the battery, the flasher, the turn signal lamps, the brake lamps, the turn signal switch assembly, the horn and the interior light so that when the ignition switch is open, closing the anti-theft switch and the bypass switch without closing the arming switch will cause intermittent flashing of the turn signal lamps and the brake lamps to provide a hazard mode, and closing the anti-theft switch and the arming switch without closing the bypass switch and thereafter opening of any one of the structural access panels will result in intermittent blasting of the horn and flashing of the turn signal lamps and the brake lamps to provide an anti-theft mode.

13. In combination with the wiring system of an automobile having a battery with a positive terminal and a negative terminal, the negative terminal of the battery being connected to a ground, at least one ignition switch connected to the positive terminal of the battery, a horn having first and second terminals, the first terminal of the horn being connected to the ground, at least one interior light having a first terminal connected to the positive terminal of the battery and a second terminal connectable to the ground by the closing of any one of a plurality of automobile body mounted switches through the opening of a corresponding one of a plurality of structural access panels of the automobile, the improvement comprising:
   an arming switch including first and second ganged switches each having first and second sides, the first side of the first ganged switch being connected to the ground and the first side of the second ganged switch being connectable to the plurality of an automobile body mounted switches;
   a flasher having first and second terminals, the first terminal of the flasher being connected to the second terminal of the horn;
   a holding relay having a switch and a coil for closing the holding relay switch when energized, the switch of the holding relay having first and second sides, the coil of the holding relay having first and second terminals, the first side of the holding relay switch being connected to the positive terminal of the battery, the second side of the holding relay switch being connected to the second terminal of the flasher and the second terminal of the holding relay coil, and the first terminal of the holding relay coil being connected to the second side of the first ganged switch of the arming switch; and
   an arming relay having a switch and a coil for closing the arming relay switch when energized, the switch of the arming relay having first and second sides, and the coil of the arming relay having first and second terminals, the first side of the arming relay switch being connected to the second terminal of the flasher and the second side of the holding relay switch, the second side of the arming relay switch being connected to the first side of the holding relay switch and to the second terminal of the arming relay coil, and the first terminal of the arming relay coil being connected to the second side of the second ganged switch of the arming switch.

* * * * *